(12) United States Patent
Zheng et al.

(10) Patent No.: US 10,830,945 B2
(45) Date of Patent: Nov. 10, 2020

(54) HIGH BANDWIDTH RADIATION-RESISTANT MULTIMODE OPTICAL FIBER

(71) Applicant: YANGTZE OPTICAL FIBRE AND CABLE JOINT STOCK LIMITED COMPANY, Hubei (CN)

(72) Inventors: Wei Zheng, Hubei (CN); Gaoqing Lei, Hubei (CN); Wu Yang, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 0 days.

(21) Appl. No.: 16/334,818

(22) PCT Filed: Nov. 8, 2017

(86) PCT No.: PCT/CN2017/109952
§ 371 (c)(1),
(2) Date: Mar. 20, 2019

(87) PCT Pub. No.: WO2018/086536
PCT Pub. Date: May 17, 2018

(65) Prior Publication Data
US 2020/0018895 A1    Jan. 16, 2020

(30) Foreign Application Priority Data

Nov. 8, 2016   (CN) .......................... 2016 1 0980482

(51) Int. Cl.
*G02B 6/028*   (2006.01)
*G02B 6/036*   (2006.01)

(52) U.S. Cl.
CPC ....... *G02B 6/0288* (2013.01); *G02B 6/03644* (2013.01); *G02B 6/03672* (2013.01)

(58) Field of Classification Search
CPC .. G02B 6/0288; G02B 6/028; G02B 6/03644; G02B 6/03672
See application file for complete search history.

(56) References Cited

U.S. PATENT DOCUMENTS 8,582,941 B2 * 11/2013 Conrad ................ G02B 6/0365
                                                        385/110
8,971,683 B2    3/2015 Chen et al.
(Continued)

FOREIGN PATENT DOCUMENTS

CN    101738681 A    6/2010
CN    102692674 A    9/2012
(Continued)

OTHER PUBLICATIONS

State Intellectual Property Office of People's Republic of China, "International Search Report for PCT Application No. PCT/CN2017/109952", China, Feb. 7, 2018.

*Primary Examiner* — Jennifer Doan
(74) *Attorney, Agent, or Firm* — Tim Tingkang Xia, Esq.; Locke Lord LLP

(57) ABSTRACT

A high bandwidth radiation-resistant multimode optical fiber includes a core and a cladding layer surrounding the core. The core is a fluorine-doped quartz glass layer with a graded refractive index distribution and a distribution power exponent α of 1.7-2.2. The core has R1 of 15-35 μm and Δ1%min of −0.8% to −1.2%. The cladding layer has an inner cladding layer having R2 of 15-38 μm and Δ2% of −0.8% to −1.2% and/or a depressed inner cladding layer having R3 of 15-55 μm and Δ3 of −1.0% to −1.4%, an intermediate cladding layer having R4 of 15.5-58 μm and Δ4 of −0.7% to −0.2% a depressed cladding layer hasving R5 of 16-60 μm and Δ5 of −0.8% to −1.2%, and an outer cladding layer sequentially formed from inside to outside. The outer cladding layer is a pure silica glass layer.

10 Claims, 2 Drawing Sheets

(56) References Cited

U.S. PATENT DOCUMENTS

| | | | |
|---|---|---|---|
| 9,268,093 B2 * | 2/2016 | Bickham | ............ G02B 6/26 |
| 2009/0154888 A1 | 6/2009 | Abbott, III et al. | |
| 2009/0169163 A1 | 7/2009 | Abbott, III et al. | |
| 2012/0039361 A1 | 2/2012 | Gooijer et al. | |
| 2013/0039626 A1 | 2/2013 | Bickham et al. | |

FOREIGN PATENT DOCUMENTS

| CN | 102692675 A | 9/2012 |
|---|---|---|
| CN | 102768382 A | 11/2012 |
| CN | 104698535 A | 6/2015 |
| CN | 105334569 A | 2/2016 |
| CN | 105759344 A | 7/2016 |
| CN | 106324752 A | 1/2017 |

* cited by examiner

HIGH BANDWIDTH RADIATION-RESISTANT MULTIMODE OPTICAL FIBER

CROSS-REFERENCE TO RELATED APPLICATIONS

This application is a U.S. national stage application of PCT Patent Application Serial No. PCT/CN2017/109952, filed Nov. 8, 2017, which itself claims priority to Chinese Patent Application No. 201610980482.0, filed Nov. 8, 2016 in the State Intellectual Property Office of P.R. China, which are hereby incorporated herein in their entireties by reference.

FIELD OF THE INVENTION

The present disclosure relates to the technical field of optical fiber, and in particular, to a high bandwidth radiation-resistant multimode optical fiber.

BACKGROUND OF THE INVENTION

With the rapid development of optical fiber communication technology, application of multi-mode optical fibers is more and more extensive. In recent years, multimode optical fibers are not only widely used in the field of conventional communications, but also applied to other high-tech fields such as sensing, measurement, control, data acquisition. These fields may involve some special application environments, including environments where high-energy radiation exists, for example, internal monitoring of nuclear reactor radioactive sources, γ-ray sterilization of medical endoscopes, submarine fiber-optic cable communications, temperature sensing monitoring of oil and gas mines, and aerospace technology.

In the above practical applications, radiation (X-rays, γ-rays, etc.) in the environment may cause radiation damage to the optical fibers to a certain extent, resulting in a reduced signal transmission capability and degraded overall performance of the optical fibers. In severe cases, it may even directly affect safety and reliability of the optical fibers during use.

Generally, radiation has an effect on optical properties of optical fibers mainly in two ways. The first way is called radiation-induced attenuation (RIA). The mechanism of RIA is that: radiation causes defects of silica in an optical fiber, and these defects may absorb transmitted electromagnetic signals. The second way is called radiation-induced refractive index change, and the mechanism thereof is that: a refractive index of an optical fiber changes to a certain degree due to radiation, and the refractive index change may damage a bandwidth of the optical fiber, thereby resulting in damage to reliability of an optical transmission system.

Among the prior arts, radiation-resistant optical fibers are mainly optimized in bandwidth and attenuation of optical fibers. For example, in US patent US 20120039361A1, attenuation of optical fibers caused by hydrogen is reduced by doping a small amount of germanium in a core layer. In Chinese patent CN 102768382, a high bandwidth is achieved by graded doping of fluorine in a core layer. However, in actual use of optical fibers, the optical fibers will inevitably bend to varying degrees. When the optical fibers suffer a large bending stress for a long time, a service life thereof will inevitably be shortened, and a transmission performance index thereof will also be reduced. To this end, it is required that the optical fibers have certain bending resistance to meet demands in different occasions. An effective way to reduce additional attenuation of optical fiber bending is to use a design of a depressed cladding layer. Similar designs are used in the US patents US 20090169163A1 and US 20090154888A1 as well as in s CN 102692674A and CN 102692675A. The principle is as follows. When an optical fiber is slightly bent, light leaking from a core of the optical fiber will be confined to an inner cladding layer and return to the core, so as to reduce additional macrobending loss of the optical fiber. However, this kind of design has a disadvantage that more high-order mode energy will be limited to a boundary of the core layer of the optical fiber, which has a large negative impact on bandwidth.

SUMMARY OF THE INVENTION

To facilitate an introduction of the present disclosure, some terms are defined.

Quartz Liner: a tubular base tube, whose inner wall contains a glassy oxidized deposit resulted by a plasma chemistry vapor deposition (PCVD) chemical reaction.

Annular Tube: a quartz glass tube that meets certain geometrical specifications and doping requirements.

Core Layer: a central part of a cross-section of an optical fiber, which is a main light guiding area of the optical fiber.

Inner Cladding Layer: an annular area next to a core layer in a cross-section of an optical fiber.

Depressed Cladding Layer: an annular area next to an inner cladding layer in a cross-section of an optical fiber.

Rising Ring: an annular area next to an inner cladding layer or a depressed cladding layer in a cross-section of an optical fiber.

Outer Cladding Layer: an annular area next to a rising ring in a cross-section of an optical fiber.

Relative Refractive Index Difference:

$$\Delta\% = \frac{n_i^2 - n_0^2}{2n_i^2} * 100\% \approx \frac{n_i - n_0}{n_0} * 100\%$$

Numerical Aperture:

$$NA = n_0 * \sqrt{2\Delta 2\Delta},$$

wherein: $n_i$ is an refractive index corresponding to different deposition layers, and $n_0$ is a refractive index of pure $SiO_2$.

Power Exponent Refractive Index distribution Profile: a refractive index distribution profile that satisfies a following power exponential function, wherein: $n_1$ is a refractive index of an optical fiber axis; r is a distance from the optical fiber axis; a is a core radius of an optical fiber; α is a distribution power exponent; and Δ is a relative refractive index difference of a core layer/a cladding layer;

$$n^2(r) = n_1^2\left[1 - 2\Delta\left(\frac{r}{a}\right)^\alpha\right] \quad r < a.$$

The technical problem to be solved by the present disclosure is to provide, with regard to the defect of the prior art, a high bandwidth radiation-resistant multimode optical fiber.

To solve the above problem, the present disclosure proposes a technical solution, in which a core layer and a cladding layer are included, wherein: the core layer is a fluorine-doped quartz glass layer with a graded refractive index distribution and a distribution power exponent a in a range from 1.7 to 2.2, and the core layer has a minimum relative refractive index difference Δ1% min in a range from −0.8% to −1.2% and a radius R1 in a range from 15 μm to 35 μm; the cladding layer outside of the core layer comprises an inner cladding layer and/or a depressed inner cladding layer, an intermediate cladding layer, a depressed cladding layer, and an outer cladding layer in sequence from inside to outside, wherein: the inner cladding layer has a radius R2 in a range from 15 μm to 38 μm and a relative refractive index difference Δ2% in a range from −0.8% to −1.2%; the depressed inner cladding layer has a radius R3 in a range from 15 μm to 55 μm and a relative refractive index difference Δ3 in a range from −1.0% to −1.4%; the intermediate cladding layer has a radius R4 in a range from 15.5 μm to 58 μm and a relative refractive index difference Δ4 in a range from −0.7% to −0.2%; the depressed cladding layer has a radius R5 in a range from 16 μm to 60 μm and a relative refractive index difference Δ5 in a range from −0.8% to −1.2%; and the outer cladding layer is a pure silica glass layer.

According to the above solution, the core layer is a pure fluorine (F)-doped quartz glass layer made of $SiO_2$-F with a Δ1%max in a range from −0.01% to 0%.

According to the above solution, a numerical aperture NA of the optical fiber is in a range from 0.17 to 0.24.

According to the above solution, the inner cladding layer, the depressed inner cladding layer, the intermediate cladding layer, and the depressed cladding layer are all fluorine (F)-doped quartz glass layers made of $SiO_2$—F.

According to the above solution, the optical fiber has a bandwidth in a range from 920 MHz·km to 4650 MHz·km at an 850 nm wavelength window.

According to the above solution, the optical fiber has a bandwidth in a range from 860 MHz·km to 2650 MHz·km at a 1300 nm wavelength window.

According to the above solution, a coating layer of the optical fiber is one or two of an acrylic resin coating, a polyimide coating, and a silicone rubber coating.

According to the above solution, the coating layer of the optical fiber is an ultraviolet curing silicone rubber coating and a high temperature resistant acrylic resin coating and has a single layer thickness of 60±5 μm, and a working temperature of the optical fiber is in a range from −40° C. to +150° C.

According to the above solution, the coating layer of the optical fiber is a thermosetting polyimide coating and has a single layer thickness of 15±3 μm, and a working temperature of the optical fiber is in a range from −50° C. to +400° C.

According to the above solution, the coating layer of the optical fiber is a thermosetting silicone rubber coating and has a single layer thickness of 60±3 μm, and a working temperature of the optical fiber is in a range from −50° C. to +150° C.

The technical solution of a method for manufacturing a radiation-resistant multimode optical fiber of the present disclosure is as follows.

A pure quartz glass liner is fixed on a plasma chemical vapor deposition (PCVD) lathe to perform doping and deposition. A fluorine (F)-containing gas is introduced into reaction gases silicon tetrachloride ($SiCL_4$) and oxygen ($O_2$) to introduce F doping. The reaction gases in the liner are ionized into plasma by microwave, and finally deposited in the form of glass on an inner wall of the liner. According to doping requirements of a profile structure of the optical fiber, an inner cladding layer and a core layer are sequentially deposited by changing a molar ratio of the doping gases in the mixed gas. After the deposition is completed, a deposition tube is collapsed into a solid preform using a collapsing lathe, and then the preform is placed in a drawing tower for drawing to obtain the optical fiber of the present disclosure.

The present disclosure has following beneficial effects. (1) All layers of an optical fiber are pure fluorine-doped quartz glass layers, so that the optical fiber has a relatively low attenuation coefficient at 850 nm and 1300 nm windows. Meanwhile, Ge doping is not involved, which can ensure that the optical fiber has less attenuation coefficient variation in an irradiation environment. (2) A fluorine-doped depressed cladding layer enables the optical fiber to have lower additional bending loss and good bending insensitivity. (3) Through optimization of the profile structure design, part of high-order mode energy in a core layer of the optical fiber can be coupled into some modes of an intermediate cladding layer (a rising ring), which prevents high-order mode energy from accumulating at an interface between the core layer and the depressed cladding layer and from leaking out of an outer cladding layer, and thus a bandwidth of the optical fiber can be increased.

DETAILED DESCRIPTION OF THE EMBODIMENTS

Specific embodiments are provided below to further explain the present disclosure. In the following tables, R1 is a radius of a core layer; R2 is a radius of an inner cladding layer; R3 is a radius of a depressed inner cladding layer; R4 is a radius of an intermediate cladding layer; and R5 is a radius of a depressed cladding layer. An outer cladding layer is a pure silica glass layer and has a radius in a range from 50 μm to 62.5 μm.

Embodiment 1

Figure 1:
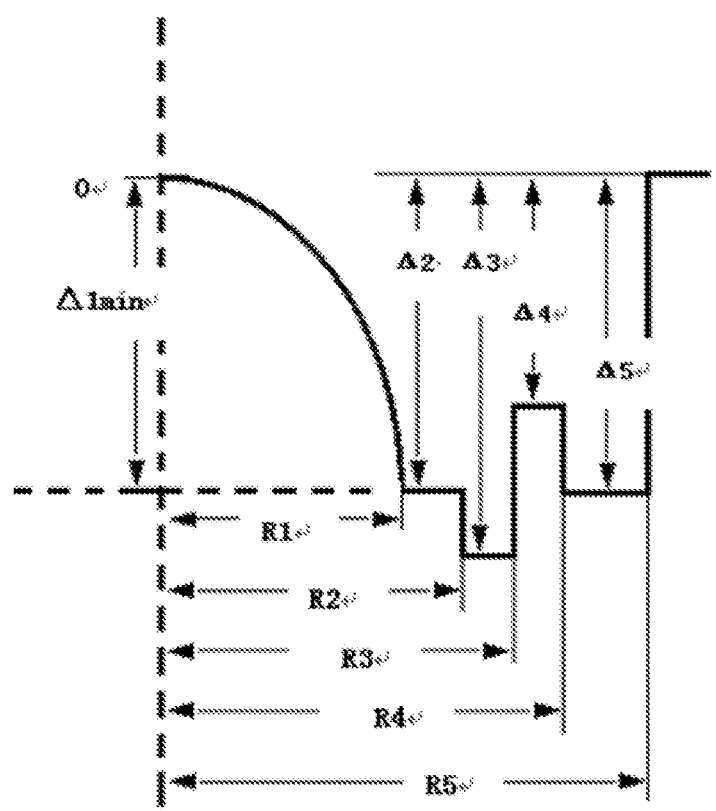
FIG. 1 is a diagram showing a structure of an optical fiber refractive index profile of an embodiment of the present disclosure.

According to design of the technical solution (as shown in FIG. 1), a cladding layer comprises an inner cladding layer and a depressed inner cladding layer. A group of preforms are manufactured according to the manufacturing method. A drawing process is performed with a drawing speed of 200 m/min and a bare optical fiber tension of 20 g. Main performance parameters are shown in a table as follows.

| Embodiment 1 | 1 | 2 | 3 | 4 | 5 |
|---|---|---|---|---|---|
| R1 (μm) | 16 | 18 | 20 | 25 | 31.25 |
| R2 (μm) | 18 | 22 | 24 | 30 | 35 |

-continued

| Embodiment 1 | 1 | 2 | 3 | 4 | 5 |
|---|---|---|---|---|---|
| R3 (μm) | 25 | 28 | 32 | 38 | 45 |
| R4 (μm) | 27 | 31 | 36 | 45 | 50 |
| R5 (μm) | 30 | 35 | 42 | 48 | 55 |
| Core Layer Distribution Power Exponent α | 1.8 | 1.85 | 2.03 | 1.98 | 2.1 |
| Δ1% min | −0.85 | −0.9 | −1.1 | −1.0 | −1.2 |
| Δ2% | −0.85 | −0.9 | −1.1 | −1.0 | −1.2 |
| Δ3% | −1.0 | −1.1 | −1.3 | −1.4 | −1.35 |
| Δ4% | −0.3 | −0.6 | −0.55 | −0.7 | −0.66 |
| Δ5% | −0.84 | −0.9 | −1.08 | −1.09 | −1.15 |
| Numerical Aperture | 0.184 | 0.19 | 0.205 | 0.2 | 0.22 |
| 850 nm Bandwidth (MHz·km) | 920 | 1100 | 3520 | 4630 | 2200 |
| 1300 nm Bandwidth (MHz·km) | 2610 | 1720 | 960 | 1160 | 867 |
| Material of Coating Layer | Acrylic Resin | Acrylic Resin | Polyimide | Silicone Rubber | Acrylic Resin/Silicone Rubber |
| Single Layer Thickness of Coating Layer | 70 | 62 | 15 | 60 | 60 |
| 850 nm Attenuation Coefficient (dB/km) | 1.82 | 1.75 | 1.7 | 1.7 | 1.65 |
| 1300 nm Attenuation Coefficient (dB/km) | 0.42 | 0.4 | 0.32 | 0.35 | 0.3 |
| 1300 nm Attenuation Increasing Amount After Irradiation (dB/km) | 51 | 43 | 42 | 42 | 50 |
| Before Irradiation — 2 Ring 7.5 mm Bending Radius Additional Macrobending Attenuation @1300 nm (dB) | 0.2 | 0.13 | 0.2 | 0.11 | 0.08 |
| Before Irradiation — 2 Ring 15 mm Bending Radius Additional Macrobending Attenuation @1300 nm (dB) | 0.09 | 0.1 | 0.11 | 0.06 | 0.05 |
| After Irradiation — 2 Ring 7.5 mm Bending Radius Additional Macrobending Attenuation @1300 nm (dB) | 0.2 | 0.14 | 0.3 | 0.12 | 0.08 |
| After Irradiation — 2 Ring 15 mm Bending Radius Additional Macrobending Attenuation @1300 nm (dB) | 0.1 | 0.1 | 0.12 | 0.06 | 0.06 |

Embodiment 2

Figure 2:
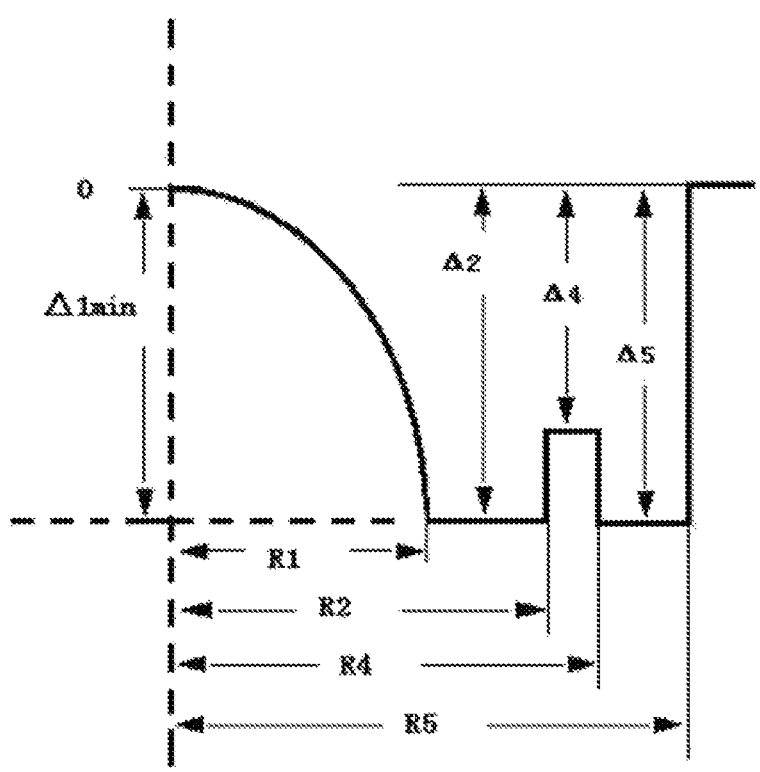
FIG. 2 is a diagram showing a structure of an optical fiber refractive index profile of another embodiment of the present disclosure.

According to design of the technical solution (as shown in FIG. 2), a depressed inner cladding layer is not included in a cladding layer. A group of preforms are manufactured according to the manufacturing method. A drawing process is performed with a drawing speed of 200 m/min and a bare optical fiber tension of 20 g. Main performance parameters are shown in a table as follows.

| Embodiment 2 | 1 | 2 | 3 | 4 | 5 |
|---|---|---|---|---|---|
| R1 (μm) | 18 | 20 | 22 | 25 | 31.25 |
| R2 (μm) | 21 | 22 | 25 | 28.5 | 35 |
| R4 (μm) | 25 | 26 | 31 | 36 | 40 |
| R5 (μm) | 50 | 45 | 45 | 48 | 55 |
| Core Layer Distribution Power Exponent α | 1.9 | 1.85 | 2.1 | 2.01 | 1.98 |
| Δ1% min | −0.9 | −0.9 | −1.1 | −1.0 | −1.2 |
| Δ2% | −0.9 | −0.91 | −1.1 | −1.0 | −1.2 |
| Δ4% | −0.4 | −0.5 | −0.6 | −0.7 | −0.8 |

-continued

| Embodiment 2 | 1 | 2 | 3 | 4 | 5 |
|---|---|---|---|---|---|
| Δ5% | −0.9 | −0.9 | −1.08 | −1.09 | −1.15 |
| Numerical Aperture | 0.19 | 0.19 | 0.205 | 0.2 | 0.22 |
| 850 nm Bandwidth (MHz-km) | 1200 | 900 | 1800 | 3860 | 3300 |
| 1300 nm Bandwidth (MHz-km) | 1630 | 1510 | 600 | 990 | 867 |
| Material of Coating Layer | Acrylic Resin | Acrylic Resin | Polyimide | Silicone Rubber | Acrylic Resin/Silicone Rubber |
| Single Layer Thickness of Coating Layer | 70 | 62 | 15 | 62 | 60 |
| 850 nm Attenuation Coefficient (dB/km) | 1.9 | 1.82 | 1.78 | 1.72 | 1.93 |
| 1300 nm Attenuation Coefficient (dB/km) | 0.44 | 0.27 | 0.34 | 0.21 | 0.4 |
| 1300 nm Attenuation Increasing Amount After Irradiation (dB/km) | 47 | 44 | 46 | 41 | 43 |
| Before Irradiation 2 Ring 7.5 mm Bending Radius Additional Macrobending Attenuation @1300 nm (dB) | 0.13 | 0.15 | 0.13 | 0.3 | 0.23 |
| 2 Ring 15 mm Bending Radius Additional Macrobending Attenuation @1300 nm (dB) | 0.1 | 0.07 | 0.1 | 0.06 | 0.11 |
| After Irradiation 2 Ring 7.5 mm Bending Radius Additional Macrobending Attenuation @1300 nm (dB) | 0.12 | 0.16 | 0.2 | 0.27 | 0.2 |
| 2 Ring 15 mm Bending Radius Additional Macrobending Attenuation @1300 nm (dB) | 0.12 | 0.1 | 0.11 | 0.07 | 0.2 |

An irradiation detection method is based on the TIA/EIA455-64 standard. The optical fiber is continuously irradiated using a cobalt-60 source (Co60 source) γ-ray source with continuous pulses having an average energy of 1.25 MeV at a dose rate of 20 rad/s for 21 hours. A total radiation dose is 1500 Krad. During irradiation, an attenuation of the optical fiber under radiation conditions is measured using a light source having a wavelength of 1300 nm.

A macrobending detection method is to test according to the IEC-60793-1-47 method. The optical fiber to be tested is wound by certain turns according to a certain diameter (15 mm, 20 mm, 60 mm, etc.), and then the wound optical fiber is released to test change in luminous power before and after wounding. Through the above two tests, compared with conventional multimode fibers of the same type and common bending-resistant optical fibers, the radiation-resistant multimode optical fiber provided by the present disclosure has a significantly lower attenuation coefficient and obviously less variation in attenuation coefficient under irradiation conditions. The macrobending test result shows that the optical fiber of the present disclosure has good performance.

What is claimed is:

1. A high bandwidth radiation-resistant multimode optical fiber, comprising a core layer and a cladding layer,
    wherein the core layer is a fluorine-doped quartz glass layer with a graded refractive index distribution and a distribution power exponent α in a range from 1.7 to 2.2, and the core layer has a minimum relative refractive index difference Δ1% min in a range from −0.8% to −1.2% and a radius R1 in a range from 15 μm to 35 μm; and
    wherein the cladding layer outside of the core layer comprises an inner cladding layer and/or a depressed inner cladding layer, an intermediate cladding layer, a depressed cladding layer, and an outer cladding layer in sequence from inside to outside, wherein: the inner cladding layer has a radius R2 in a range from 15 μm to 38 μm and a relative refractive index difference Δ2% in a range from −0.8% to −1.2%; the depressed inner cladding layer has a radius R3 in a range from 15 μm to 55 μm and a relative refractive index difference Δ3 in a range from −1.0% to −1.4%; the intermediate cladding layer has a radius R4 in a range from 15.5 μm to 58 μm and a relative refractive index difference Δ4 in a range from −0.7% to −0.2%; the depressed cladding layer has a radius R5 in a range from 16 μm to 60 μm and a relative refractive index difference Δ5 in a range from −0.8% to −1.2%; and the outer cladding layer is a pure silica glass layer.

2. The high bandwidth radiation-resistant multimode optical fiber according to claim 1, wherein the core layer has a maximum relative refractive index difference Δ1% max in a range from −0.01% to 0%.

3. The high bandwidth radiation-resistant multimode optical fiber according to claim 1, wherein a numerical aperture NA of the optical fiber is in a range from 0.17 to 0.24.

4. The high bandwidth radiation-resistant multimode optical fiber according to claim 1, wherein the inner cladding layer, the depressed inner cladding layer, the intermediate cladding layer, and the depressed cladding layer are all fluorine-doped quartz glass layers made of $SiO_2$-F.

5. The high bandwidth radiation-resistant multimode optical fiber according to claim 1, wherein the optical fiber has a bandwidth in a range from 920 MHz-km to 4650 MHz-km at an 850 nm wavelength window.

6. The high bandwidth radiation-resistant multimode optical fiber according to claim 1, wherein the optical fiber has a bandwidth in a range from 860 MHz-km to 2650 MHz-km at a 1300 nm wavelength window.

7. The high bandwidth radiation-resistant multimode optical fiber according to claim 1, wherein a coating layer of the optical fiber is one or two of an acrylic resin coating, a polyimide coating, and a silicone rubber coating.

8. The high bandwidth radiation-resistant multimode optical fiber according to claim 7, wherein the coating layer of the optical fiber is an ultraviolet curing silicone rubber coating and a high temperature resistant acrylic resin coating and has a single layer thickness of 60±5 μm, and a working temperature of the optical fiber is in a range from −40° C. to +150° C.

9. The high bandwidth radiation-resistant multimode optical fiber according to claim 7, wherein, the coating layer of the optical fiber is a thermosetting polyimide coating and has a single layer thickness of 15±3 μm, and a working temperature of the optical fiber is in a range from −50° C. to +400° C.

10. The high bandwidth radiation-resistant multimode optical fiber according to claim 7, wherein, the coating layer of the optical fiber is a thermosetting silicone rubber coating and has a single layer thickness of 60±3 μm, and a working temperature of the optical fiber is in a range from −50° C. to +150° C.

* * * * *